United States Patent
Andrea et al.

(10) Patent No.: US 12,067,169 B2
(45) Date of Patent: Aug. 20, 2024

(54) APPARATUS AND METHOD FOR RENDERING DYNAMIC HAPTIC RESPONSE OF FLEXIBLE OBJECT

(71) Applicant: KAIST (Korea Advanced Institute of Science and Technology), Daejeon (KR)

(72) Inventors: Bianchi Andrea, Daejeon (KR); Neung Ryu, Daejeon (KR); Woo Jin Lee, Daejeon (KR); Myung Jin Kim, Daejeon (KR)

(73) Assignee: KAIST (KOREA ADVANCED INSTITUTE OF SCIENCE AND TECHNOLOGY), Daejeon (KR)

( * ) Notice: Subject to any disclaimer, the term of this patent is extended or adjusted under 35 U.S.C. 154(b) by 0 days.

(21) Appl. No.: 18/215,882

(22) Filed: Jun. 29, 2023

(65) Prior Publication Data
US 2023/0418382 A1 Dec. 28, 2023

Related U.S. Application Data

(63) Continuation of application No. PCT/KR2021/005128, filed on Apr. 22, 2021.

(30) Foreign Application Priority Data

Dec. 31, 2020 (KR) .......... 10-2020-0189658

(51) Int. Cl.
G06F 3/01 (2006.01)
G06F 3/0346 (2013.01)
G06F 3/038 (2013.01)

(52) U.S. Cl.
CPC .......... *G06F 3/016* (2013.01); *G06F 3/011* (2013.01); *G06F 3/0383* (2013.01); *G06F 2203/013* (2013.01); *G06F 2203/0383* (2013.01)

(58) Field of Classification Search
None
See application file for complete search history.

(56) References Cited

U.S. PATENT DOCUMENTS

| | | | |
|---|---|---|---|
| 11,481,029 B2* | 10/2022 | Gupta | G02B 27/0179 |
| 2014/0101560 A1* | 4/2014 | Kwak | G06F 3/0488 |
| | | | 715/788 |
| 2014/0240109 A1* | 8/2014 | Aviles | G06F 3/016 |
| | | | 340/407.1 |
| 2018/0116851 A1* | 5/2018 | Lee | A61F 5/0102 |
| 2018/0311570 A1* | 11/2018 | Buchanan | A63F 13/24 |
| 2020/0285318 A1* | 9/2020 | Taylor | G06F 3/038 |

* cited by examiner

*Primary Examiner* — Sepehr Azari
(74) *Attorney, Agent, or Firm* — LEX IP MEISTER, PLLC

(57) ABSTRACT

An apparatus and method for implementing dynamic tactile feedback of a flexible object are disclosed. The apparatus enables recognition of a continuous change in stiffness of an object due to a dynamic response of the flexible object. The method enables recognition of such changes through control of the device.

The method enables a user to continuously control the stiffness of a device used as a tool for haptic feedback. This further enables various virtual world sensations associated with virtual reality or augmented reality content to be expressed in direct relation to the length, shape, material, etc. of virtual objects, and also enables various virtual world sensations to be realized through such devices.

18 Claims, 17 Drawing Sheets

$$\kappa = 4kw^2$$

APPARATUS AND METHOD FOR RENDERING DYNAMIC HAPTIC RESPONSE OF FLEXIBLE OBJECT

BACKGROUND OF THE INVENTION

1. Field of the Invention

The present invention relates to an apparatus and method for rendering dynamic tactile feedback of a flexible object, and more particularly, to an apparatus for perceiving the continuous changes in stiffness of a flexible object caused by the dynamic response of the flexible object, and to a method for perceiving such changes through control of the apparatus.

2. Description of the Related Art

Haptic feedback greatly increases the realism and entertainment value of virtual reality (VR) applications, and researchers in industry and academia have shown that users' perception of virtual worlds is strongly influenced by tangible proxies and haptics illusions. These, along with visual interfaces, have contributed to altering the sense of perceiving reality by inducing sensations as if they were being felt. From this approach, many researchers have proposed force-feedback controllers to create dynamic properties to simulate weight, mass transfer, impact, and damped oscillations. However, previous studies have not focused on the case where the object being held by the hand is a flexible object, such as in a swinging arm action. In other words, there hasn't been enough research on perceiving the stiffness of flexible objects. Although some studies have tried to implement the stiffness of deforming or bending objects, they only change the reactive properties of the device in a few discrete steps, and no work has been done to recognize the continuous change in stiffness of a flexible object due to the dynamic response of the flexible object.

PRIOR ART LITERATURE

Non-Patent Literature (Non-patent literature 1)1. "Drag:on—A Virtual Reality Controller Providing Haptic Feedback Based on Drag and Weight Shift (CHI 2019, May 4-9, 2019, Glasgow, Scotland, UK)"

(Non-patent literature 2)2. "ElastOscillation: 3D Multi-level Force Feedback for Damped Oscillation on VR Controllers (CHI 2020, Apr. 25-30, 2020, Honolulu, HI, USA)"

SUMMARY OF THE INVENTION

The present invention was conceived to solve such problems, and aims to provide an apparatus that enables a user to control the stiffness of a device used as a tool for haptic feedback continuously, thereby enabling the user to express various virtual world sensations associated with virtual reality or augmented reality content in direct relation to the length, shape, material, etc. of virtual objects, and a method for realizing various virtual world sensations through such an apparatus.

To accomplish such object, an apparatus for implementing dynamic haptic response of a flexible object (hereinafter referred to as a "virtual flexible object implementation apparatus") in accordance with the present invention comprises: a quaternion joint that fulfills the role of a joint, capable of being bent in any direction of 360 degrees according to an applied force; four (4) tendons, each rotating in the form of a loop, which are strings, each causing expansion or contraction depending on a particular direction in which said quaternion joint is bent; a spool, which rotates to support the loop formed by the string of each of said tendons at one end; a pulley supporting and rotating the loop formed by the string of each of said tendons at an opposite end of said spool; and, a control device for controlling the rotation of said spool of each of said tendons.

The spool may include a first spool; and, a second spool laterally attached to said first spool and rotating in a same direction as said first spool.

The strings of each tendon may include a first wire having one end fixedly attached to said first spool; and a second wire fixedly having one end attached to said second spool and other end connected in series with said first wire, wherein said first wire is made of a material having a higher elasticity than that of said second wire.

The apparatus may further comprise a communication unit for receiving control messages for controlling a stiffness of each of said tendons from a device on which a virtual reality (VR) or an augmented reality (AR) content is operated.

The control message may include a stiffness value to be set for each of said tendons, and the control device may control rotation of the spool on which the string of each tendon is wound or unwound, based on the received stiffness value.

The control device may include a table mapping the stiffness value to be set on the tendon to a corresponding number of revolutions of the spool and controls rotation of the spool according to the corresponding number of revolutions of the spool mapped to the received stiffness value.

The apparatus may further comprise a motor to drive rotation of the spool.

The apparatus may further comprise a front tracker for measuring a position of a front surface of said virtual flexible object implementation apparatus; and, a rear tracker for measuring a position of a rear surface of said virtual flexible object implementation apparatus.

Position information of the front surface measured by the front tracker may be directly transmitted by the front tracker to a device on which a VR/AR content is operated (hereinafter referred to as the "VR/AR device") or transmitted by the control device to the VR/AR device via the communication unit, and position information of the rear surface measured by the rear tracker may be directly transmitted by the rear tracker to a device on which the VR/AR content is operated (hereinafter referred to as the "VR/AR device") or transmitted by the control device to the VR/AR device through the communication unit.

The apparatus may further comprise a handle for gripping by a user.

Other handle for gripping by the user may be configured to further engage an end of said quaternion joint so that said user can grip and apply force with both hands.

In accordance with other aspect of the present invention, a method for controlling the virtual flexible object implementation apparatus to implement dynamic haptic response of a flexible object comprises steps of: (a) receiving a control message for controlling stiffness of each tendon of said virtual flexible implementation apparatus from a device operating a virtual reality (VR) or an augmented reality (AR) content (hereinafter referred to as a "VR/AR device");

and (b) controlling the stiffness of each tendon of said virtual flexible object implementation apparatus in accordance with said control message.

The control message received in the step (a) may include a stiffness value to be set for each of said tendons, and, in the step (b), controlling rotation of the spool on which the string of each tendon may be wound or unwound based on the received stiffness value.

In the step (b), rotation of the spool may be controlled based on a value of a number of revolutions of the spool mapped to the received stiffness value.

In accordance with another aspect of the present invention, a device for controlling the virtual flexible object implementation apparatus of claim 1 to implement dynamic haptic response of a flexible object comprises: at least one processor; and at least one memory storing computer executable instructions, wherein the computer executable instructions stored in said at least one memory cause said at least one processor, (a) receiving a control message for controlling stiffness of each tendon of said virtual flexible implementation apparatus from a device operating a virtual reality (VR) or an augmented reality (AR) content (hereinafter referred to as a "VR/AR device"); and (b) controlling the stiffness of each tendon of said virtual flexible object implementation apparatus in accordance with said control message, wherein the step (a) and the step (b) are performed continuously and repeatedly in accordance with progression of content in said VR/AR device.

In accordance with another aspect of the present invention, a method, by a device on which a virtual reality (VR) or an augmented reality (AR) content is operated (hereinafter referred to as a "VR/AR device"), for implementing deformation of a virtual flexible object on a screen of the VR/AR content through an operation of a VR/AR content application comprises (a) receiving, from a virtual flexible object implementation apparatus, front position information of said virtual flexible object implementation apparatus measured by a front tracker, and rear position information of said virtual flexible object implementation apparatus measured by a rear tracker; (b) calculating, from said front position information and said rear position information, for any point on said virtual flexible object in an unfolded state on the screen, a position information moved by a bending of said virtual flexible object implementation apparatus; and (c) rendering said virtual flexible object on the screen according to said calculated position information.

The step (b) may include: (b1) determining, from said rear position information, a position of origin; (b2) calculating, from said front position information, an angle that a straight line connecting said origin and said front position forms with a centerline of said virtual flexible object passing through said origin in a state in which said virtual flexible object is stretched; and (b3) calculating, from said angle, a position of any point on said virtual flexible object in the stretched state that has been displaced by the bending of said virtual flexible object implementation apparatus.

The location information moved in step (b3) is calculated by (rc-y,2θx/l) in cylindrical coordinates, $$r_c = \frac{l}{2\theta}$$

where l is the length of the virtual flexible object, θ is the angle that a straight line connecting said origin and said front position makes with the centerline of said virtual flexible object as it passes through said origin when the virtual flexible object is stretched, x is the x-coordinate in the cartesian coordinate system of any point on the virtual flexible object in the extended state, y is the y-coordinate in the cartesian coordinate system of an arbitrary point on the virtual flexible object in the extended state.

According to the present invention, by enabling a user to control the stiffness of a device used as a tool for haptic feedback continuously, an apparatus for expressing various virtual world sensations associated with virtual reality or augmented reality content in direct relation to the length, shape, material, etc. of a virtual object, and a method for realizing various virtual world sensations through such an apparatus are provided.

DETAILED DESCRIPTION OF THE INVENTION

Figure 1:
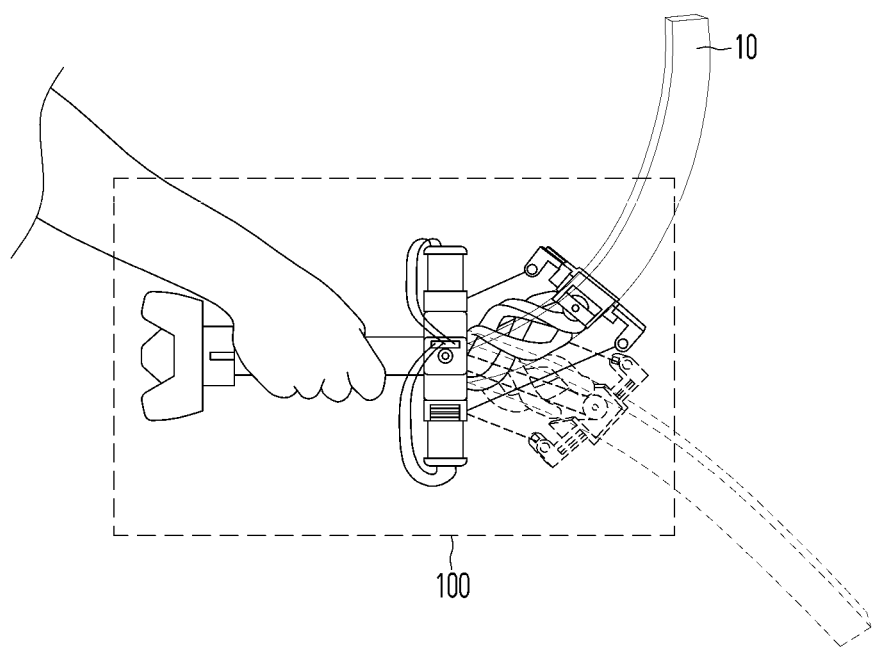
FIG. 1 is a drawing illustrating a virtual flexible beam realized from the movement of a device implementing dynamic tactile feedback of a flexible object (hereinafter referred to as the "virtual flexible object implementation device") of the present invention.

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle that the concepts of the terms may be properly defined by the inventor(s) to describe the invention. Since the examples described in the specification and the configurations illustrated in the drawings are merely preferred embodiments of the present invention and cannot represent all the technical sprints of the present invention, it should be understood that various equivalents and modifications that may replace them can be present.

FIG. 1 is a diagram illustrating a virtual flexible beam 10 that is realized from the movement of a device 100 that implements dynamic tactile feedback of a flexible object of the present invention (hereinafter referred to as a "virtual flexible object implementation device").

The virtual flexible beam may be in the form of, for example, a rubber beam, and as it swings, it bends as shown. As it bends, a response, such as a force felt by the user's hand, can be felt by the virtual flexible object implementation device 100 of the present invention. Furthermore, depending on the various situations in virtual reality (VR) or augmented reality (AR) contents, the virtual flexible object implementation device 100 enables the user to sense various forces applied to the hand, thereby enabling the user to enjoy the contents more vividly.

Figure 2:
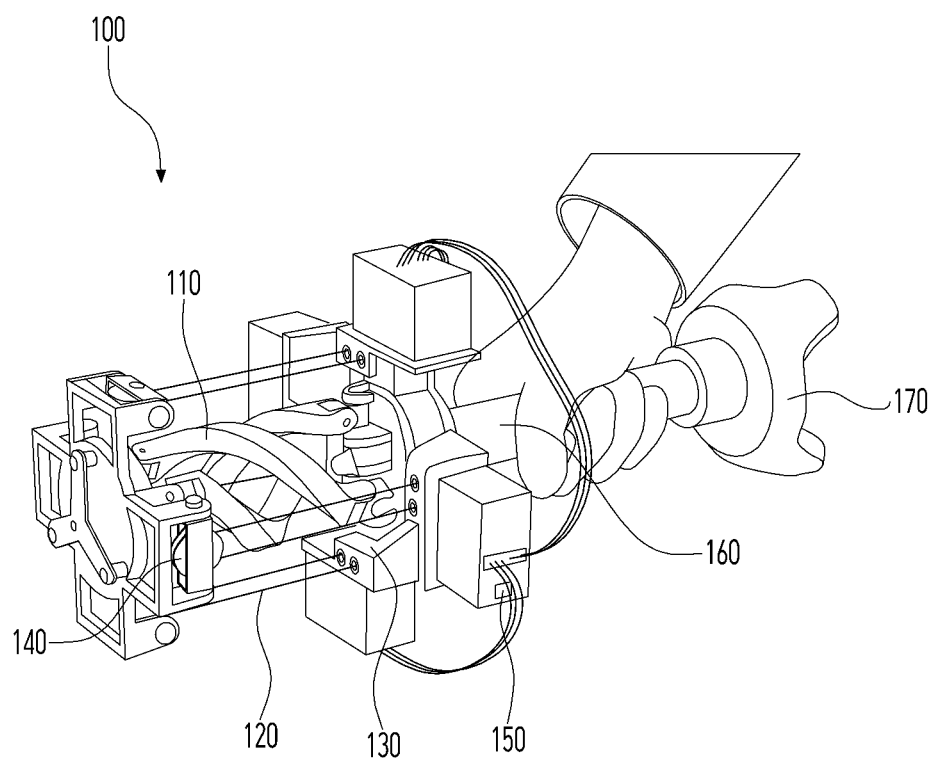
FIG. 2 is a drawing illustrating the overall structure of the virtual flexible object implementation device of the present invention.
Figure 3:
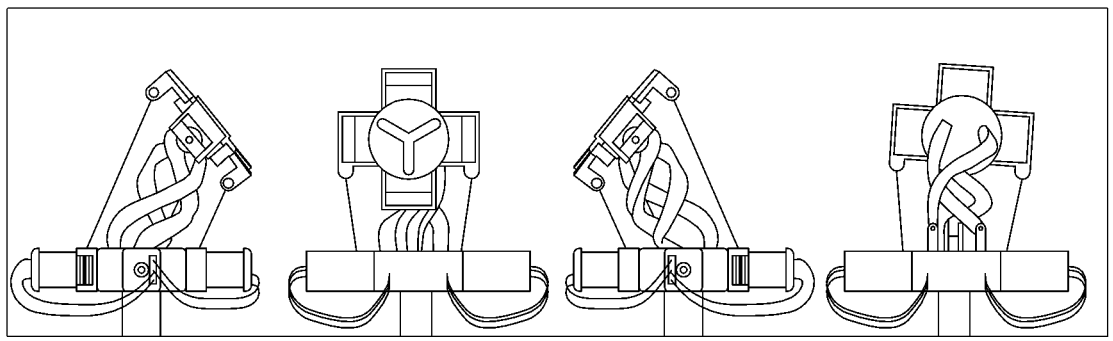
FIG. 3 is a drawing depicting the virtual flexible object implementation device of the present invention bending in each direction.

FIG. 2 is a drawing illustrating the overall structure of the virtual flexible object implementation device 100 of the present invention, and FIG. 3 is a drawing illustrating the bending form of the virtual flexible object implementation device 100 of the present invention in each direction.

In the virtual flexible object implementation device 100, the quaternion joint 110 plays the role of a joint, which can be bent in any direction of 360 degrees, as shown in FIG. 3. Also shown in FIG. 3, depending on the specific direction in which the quaternion joint 110 is bent, each of the four tendons 120 causes expansion or contraction, and in this invention, by varying the stiffness of each of the four tendons 120, the perceived stiffness of the hand can be adjusted in response to the movement of a hypothetical flexible object.

Each tendon 120 comprises a string of two wires, which are looped around a spool 130 at one end and a pulley 140 at the other end to rotate together as the spool 130 and pulley 140 rotate, thereby adjusting the stiffness of the tendon 120.

The mechanism for adjusting the stiffness of the tendon 120 will be described in more detail with reference to FIG. 5. A motor 150 is driven by a control unit (not shown) to rotate the spool 130. The user grasps the handle 160 to move the virtual flexible object implementation device 100.

Figure 4A:
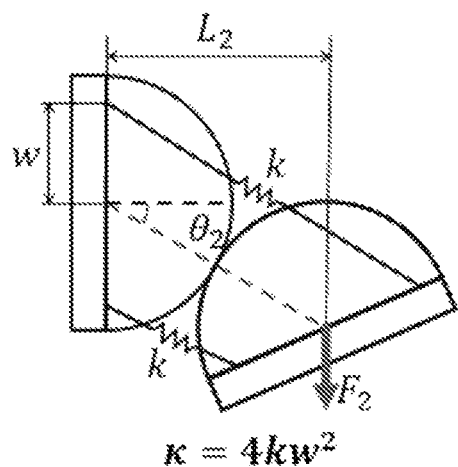
FIG. 4A is a diagram to illustrate a state in which the quaternion joint of the virtual flexible object implementation device is bent in one direction.
Figure 4B:
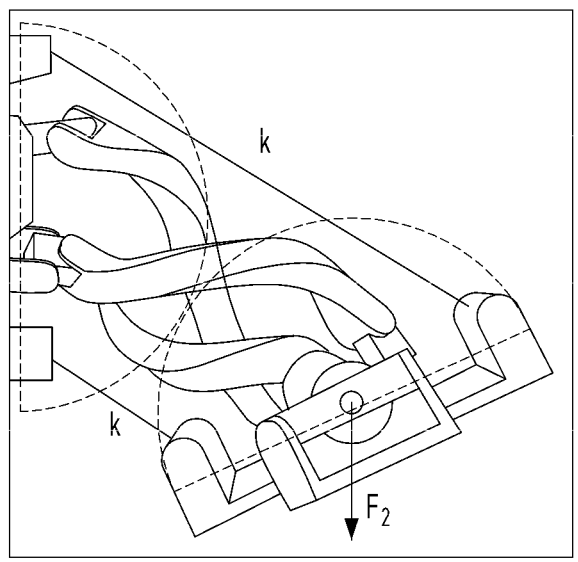
FIG. 4B is a diagrammatic representation of the state of FIG. 4A.
Figure 5:
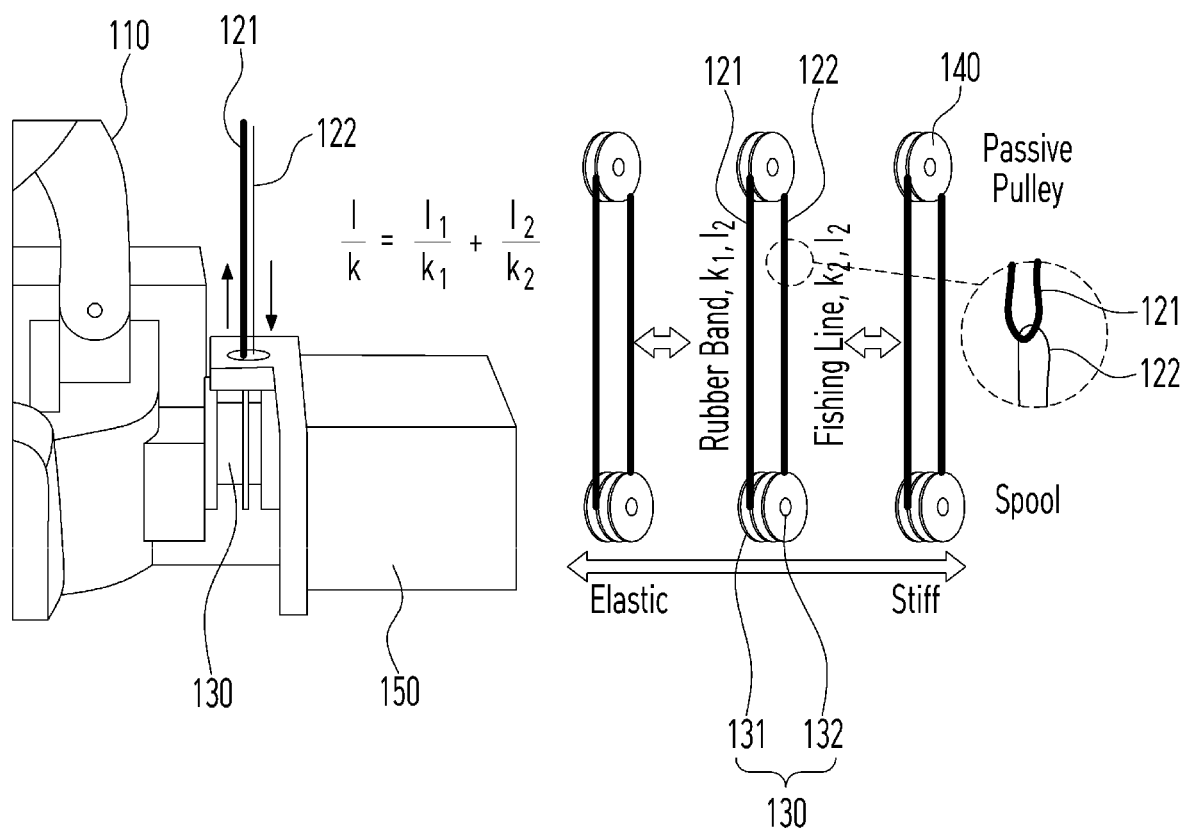
FIG. 5 is a drawing to illustrate a configurational feature to perform a continuous change in stiffness in the virtual flexible object implementation device of the present invention.

FIGS. 4A and 4B are drawings to illustrate the rotational stiffness of the virtual flexible object implementation device 100 of the present invention, and FIG. 5 is a drawing to illustrate a configuration feature to perform a continuous change of stiffness in the virtual flexible object implementation device 100 of the present invention.

FIG. 4A is a diagram illustrating a state in which the quaternion joint 110 of the virtual flexible object implementation device 100 of the present invention is bent in one direction, thereby causing some of the four tendons 120 to expand and some to contract. Such state may be represented by the two hemispheres rolling on each other's surfaces as shown in FIG. 4A, and a diagrammatic representation of such state is shown in FIG. 4B. In FIG. 4B, κ represents a rotational stiffness of, for example, a hypothetical beam 10 (see FIG. 1). k is the stiffness of the tendon 120, w is the distance between the center of the base plate of the quaternion joint 110 and the tip of the tendon 120, and θ is the bending angle of the quaternion joint 110. Then, the following equation holds:

$$F \times L = \kappa \theta$$

In other words, the bending angle of the quaternion joint 110 is inversely proportional to its rotational stiffness, which means that the stiffer the hypothetical beam 10 (see FIG. 1), the less it bends.

Each of the four tendons 120 has a structure as shown in FIG. 5. The strings that make up the tendons 120 are made of two wires connected to each other that are made of different materials, i.e., different elasticities. The first wire 121 of the tendon 120 string is a highly elastic material, such as a rubber band, and the second wire 122 is an inelastic material, such as a fishing line. There is a pair of spools 130, which are referred to as a first spool 131 and a second spool 132, respectively. One end of the first wire 121 is fixed to the first spool 131, and one end of the second wire 122 is fixed to the second spool 132.

At this time, the first spool 131 and the second spool 132 are integrally coupled and rotate together in the same direction, and when the entire spool 130 is rotated clockwise in FIG. 5, the elastic first wire 121 is unwound from the first spool 122 and the inelastic second wire 122 is wound on the second spool 122 at the same time. Thus, the string exposed between the spool 130 and the pulley 140 is increasingly filled with the elastic first wire 121 and the tendon 120 becomes progressively more elastic.

Conversely, if the entire spool 130 is rotated counterclockwise in FIG. 5, the elastic first wire 121 is wound on the first spool 122, while the inelastic second wire 122 is unwound from the second spool 122. Thus, the string exposed between the spool 130 and the pulley 140 is filled with more and more of the inelastic second wire 122, and the tendon 120 becomes progressively more inelastic (stiff).

According to the principle described above, it is possible to adjust the rotational stiffness of the string, i.e. the tendon 120 by adjusting the number of revolutions of the spool. In this case, when the length of the first wire is represented as $l_1$ and the modulus of elasticity $k_1$, the length of the second wire $l_2$ and the modulus of elasticity $k_2$, and the length of the entire string $l$ and the modulus of elasticity $k$, the following equation is established:

$$\frac{l}{k} = \frac{l_1}{k_1} + \frac{l_2}{k_2}$$

Figure 6:
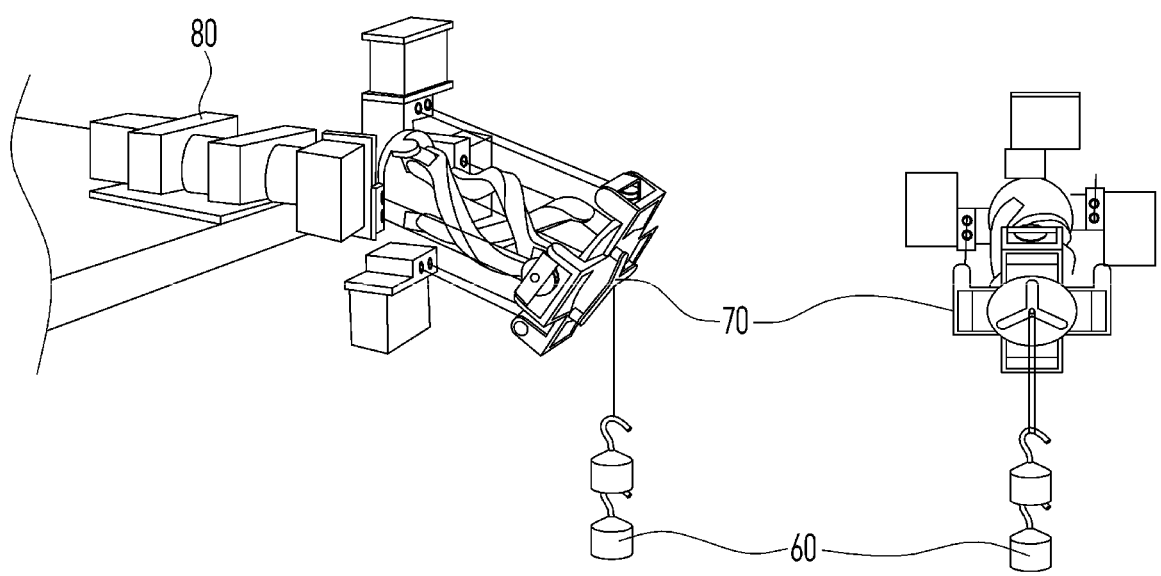
FIG. 6 is a drawing illustrating a setup state of the virtual flexible object implementation device for measuring stiffness.
Figure 7:
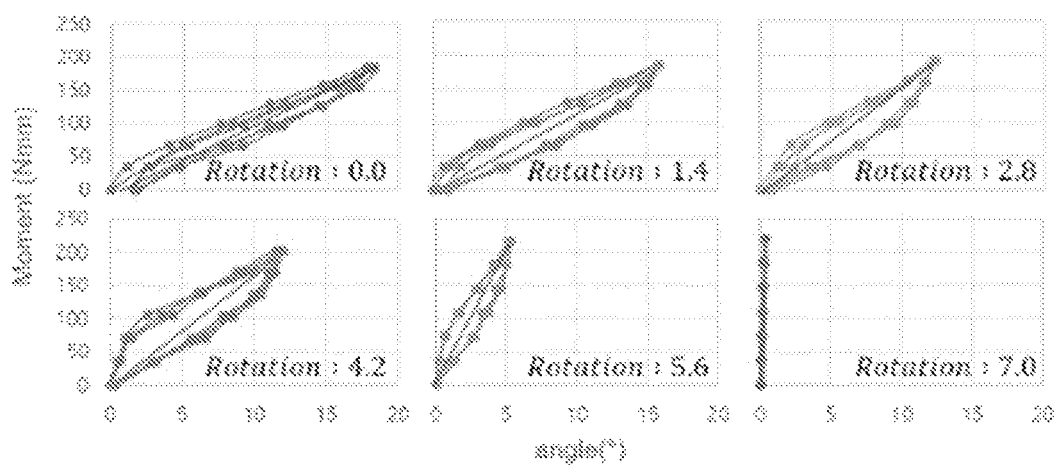
FIG. 7 illustrates an angle-moment curve as a function of the number of revolutions set on a tendon in the virtual flexible object implementation device.
Figure 8:
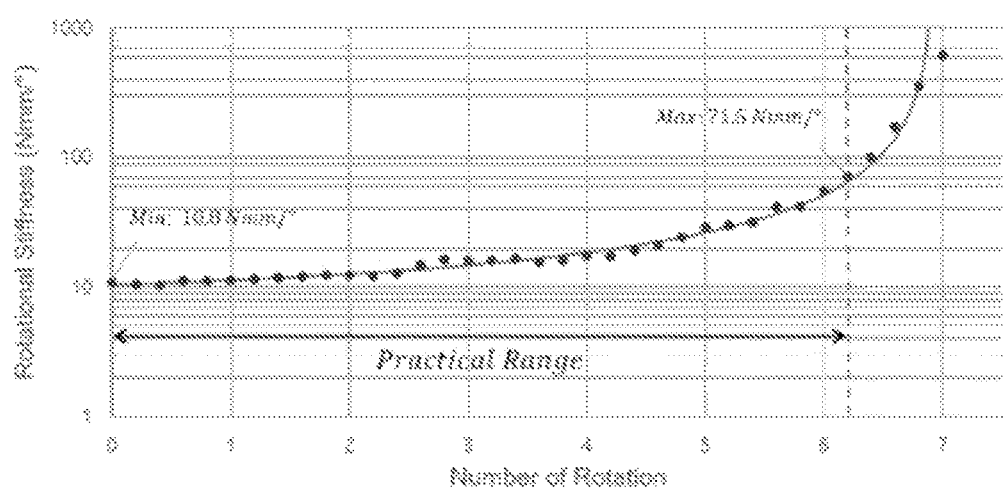
FIG. 8 illustrates a relationship curve of rotational stiffness of the virtual flexible object implementation device as a function of the number of revolutions set on the tendon in the virtual flexible object implementation device.

Referring now to FIGS. 6 through 8, the relationship between the number of revolutions set on the tendon and the rotational stiffness of the virtual flexible object implementation device 100 as a result of driving the virtual flexible object implementation device 100 having such structure of the present invention will be described.

FIG. 6 is a diagram illustrating a setup state of a virtual flexible object implementation device for measuring stiffness, FIG. 7 is a diagram illustrating an angle-moment curve as a function of the number of revolutions set on the tendon in the virtual flexible object implementation device, and FIG. 8 is a diagram illustrating a relationship curve of the number of revolutions set on the tendon in the virtual flexible object implementation device and the rotational stiffness of the virtual flexible object implementation device.

As shown in FIG. 6, the virtual flexible object implementation device 100 is secured to a table, and the bending of the quaternion joint 110 is measured using a gyro sensor while varying a weight strapped to an end of the virtual flexible object implementation device 100. In particular, this process is repeated while varying the number of revolutions of the spool 130 as described above with reference to FIG. 5. That is, the bending of the quaternion joint 110 is measured repeatedly, starting with zero revolution with the second wire 122 fully wound on the second spool 132, i.e., with the entire string of the tendon 120 at its most "elastic", and increasing the number of revolutions as the spool 130 is rotated counterclockwise from there. The result is shown in FIG. 7.

Referring to FIG. 7, each curve is a measurement of the bending of the quaternion joint 110, i.e., the 'angle' in the horizontal axis, as the weight attached to the end of the virtual flexible object implementation device 100, i.e., the 'moment' in the vertical axis, increases, while holding the stiffness of the tendon 120 constant by holding the spool 130 at a constant number of revolutions. And, each curve is a measurement of the moment-angle relationship as the number of revolutions of the spool 130 is increased in increments of 0.2. It can be seen that, toward the lower right of the six graphs, i.e., as the stiffness of the tendon 120 is increased by increasing the number of revolutions of the spool 130, the increase in the bending angle of the quaternion joint 110 becomes smaller despite the increase in moment in the graphs.

FIG. 8, as described above, is a diagram illustrating a relationship curve between the number of rotations set on the tendon in the virtual flexible object implementation device (horizontal axis) and the rotational stiffness of the virtual flexible object implementation device (vertical axis), wherein the rotational stiffness, κ, is a value calculated by the following equation.

$$\kappa = \frac{M_{max} - M_{min}}{\theta_{max} - \theta_{min}}$$

Where $M_{max}$, $M_{min}$, $\theta_{max}$, and $\theta_{min}$ are obtained from each curve of the graph in FIG. 7, $M_{max}$: Maximum moment
$M_{min}$: minimum moment
$\theta_{max}$: maximum bending angle
$\theta_{min}$: minimum bending angle for each curve of the graph of FIG. 7. It indicates the average slope of each curve, and the smaller the value, the weaker the rotational stiffness and the more flexible it is, and the larger the value, the stronger the rotational stiffness and the stiffer it is.

Figure 9:
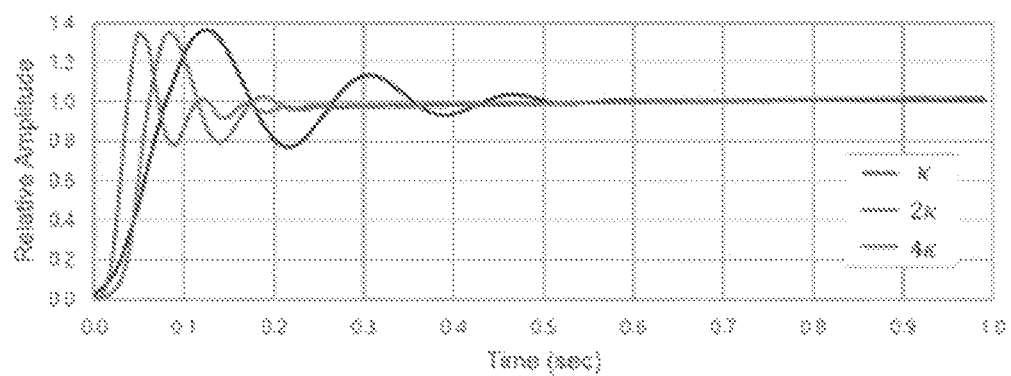
FIG. 9 is a drawing depicting a step-response of the virtual flexible object implementation device for three reference stiffness values.

FIG. 9 is a diagram depicting the step-response of the virtual flexible object implementation device for three reference stiffness values.

These curves are used to determine inertia and damping coefficients, which can ultimately be $\zeta_{ed}$ to simulate virtual objects in VR or AR application $I_{eq}$ ntent. The three curves in FIG. 9 represent the cases of κ(91), 2κ(92), and 4κ(93), respectively, where κ is 12.5 Nmm/°, 2κ is 25 Nmm/°, and 4κ is 50 Nmm/°. These results are also summarized in the table below, where $f_d$ is the damped frequency and OS % is the percentage overshoot, where is the damping ratio, $f_n$ is the natural frequency, and is the equivalent inertia.

|  | $f_d$ (Hz) | $f_n$ (Hz) | $I_{eq}^*$ (g · m²) | OS % | $\zeta^*$ |
| --- | --- | --- | --- | --- | --- |
| κ | 5.47 | 5.53 | 0.570 | 62.5 | 0.148 |
| 2κ | 7.81 | 7.95 | 0.564 | 54.9 | 0.187 |
| 4κ | 11.09 | 11.21 | 0.559 | 66.8 | 0.128 |

Figure 10:
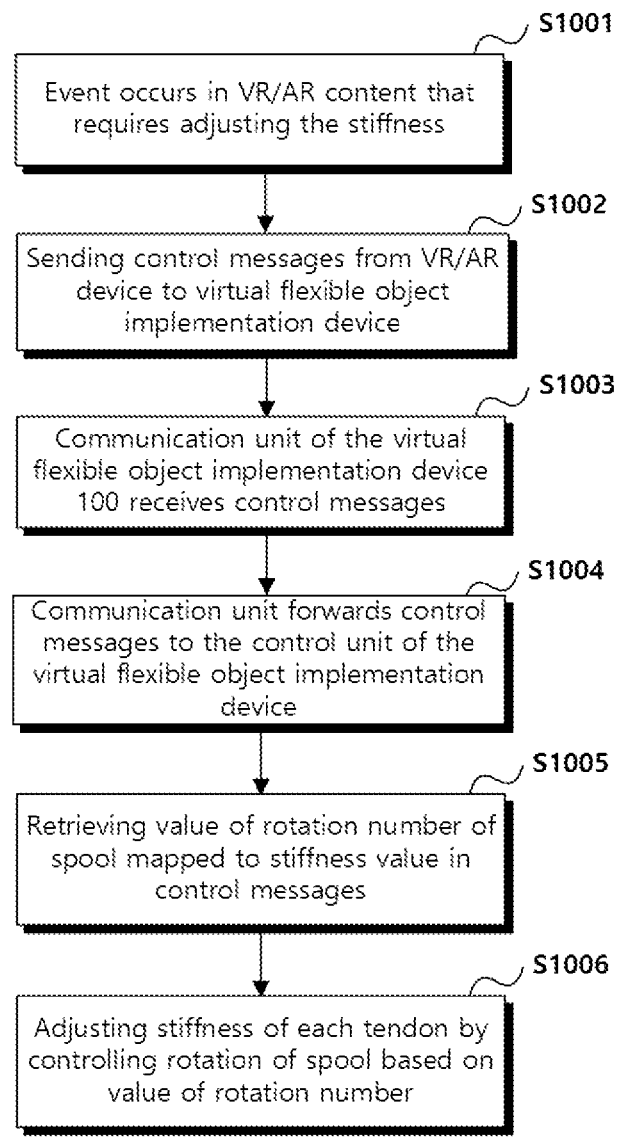
FIG. 10 is a flowchart depicting a control method for implementing dynamic tactile feedback of a virtual flexible object, in the virtual flexible object implementation device.

FIG. 10 is a flowchart illustrating a control method for implementing dynamic tactile feedback of a virtual flexible object by the virtual flexible object implementation device 100.

A device that operates virtual reality (VR) or augmented reality (AR) content (hereinafter referred to as a "VR/AR device") sends a stiffness value to be sensed by a user to a control unit of the virtual flexible object implementation device 100 when an event occurs (S1001) that requires adjusting the stiffness of the virtual flexible object implementation device 100 according to an action in the content as the content progresses. Such a value may be sent in the form of a control message for controlling the stiffness of each tendon of the virtual flexible object implementation device 100 (S1002). The communication unit of the virtual flexible object implementation device 100 receives these control messages (S1003) and forwards them to the control unit of the virtual flexible object implementation device 100 (S1004). Specifically, the control messages received may include stiffness values to be set for each of the four tendons.

The control unit may be configured to control the stiffness of each tendon of the virtual flexible object implementation device in accordance with the control message, specifically, to adjust the stiffness of the tendon by retrieving (S1005) a value of rotation number of the spool mapped to the stiffness value received in the control message and controlling (S1006) the rotation of the spool based on the value of rotation number. To accomplish this, the control unit may have a table as a database in which the stiffness value to be set for the tendon and the corresponding value of rotation number of spool are mapped.

As the content progresses in the VR/AR device, steps S1001 to S1006 may be repeated continuously whenever it is necessary to adjust the stiffness of the virtual object.

Figure 11:
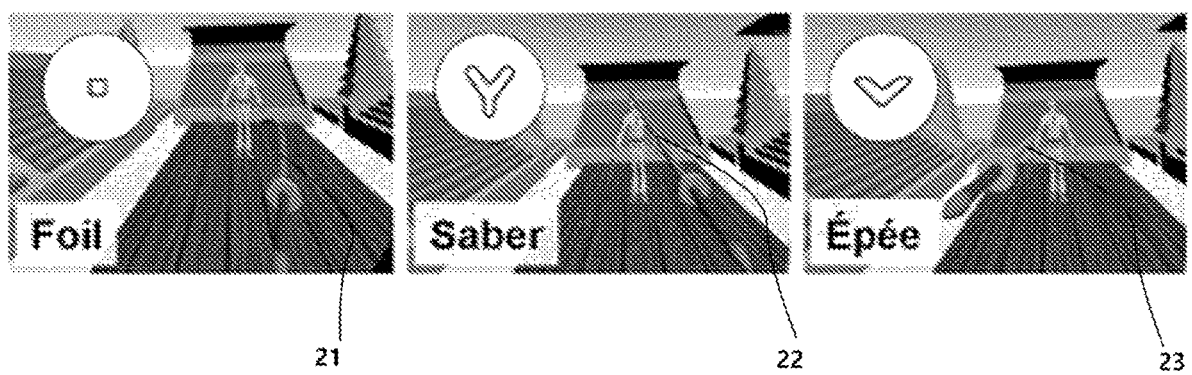
FIG. 11 is a drawing depicting a first embodiment of an application using the virtual flexible object implementation device and method of the present invention.
Figure 12:
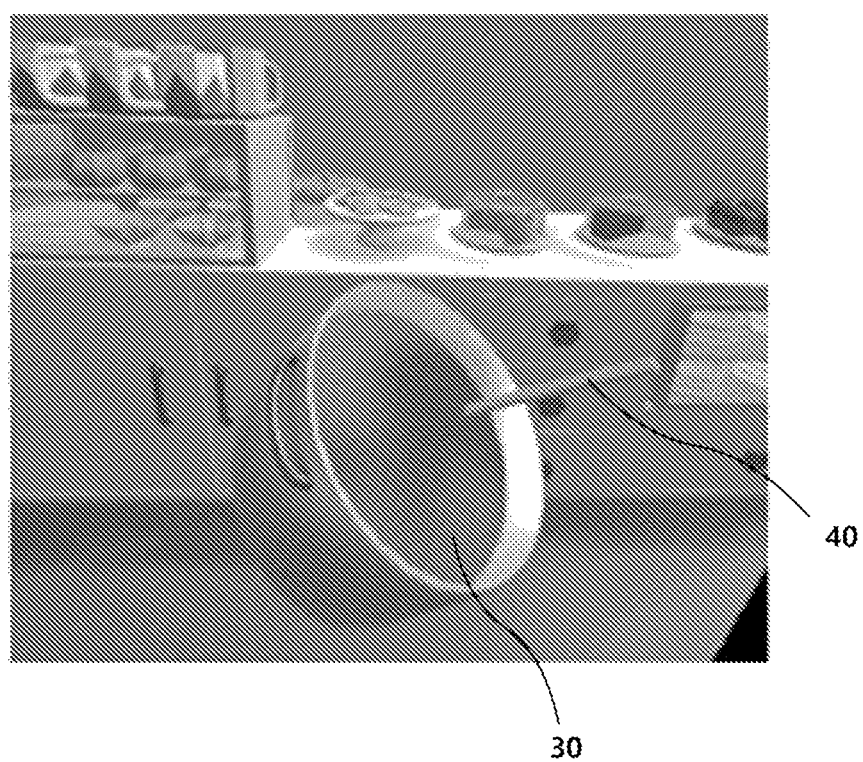
FIG. 12 is a drawing illustrating a second embodiment of an application using the virtual flexible object implementation device and method of the present invention.
Figure 13:
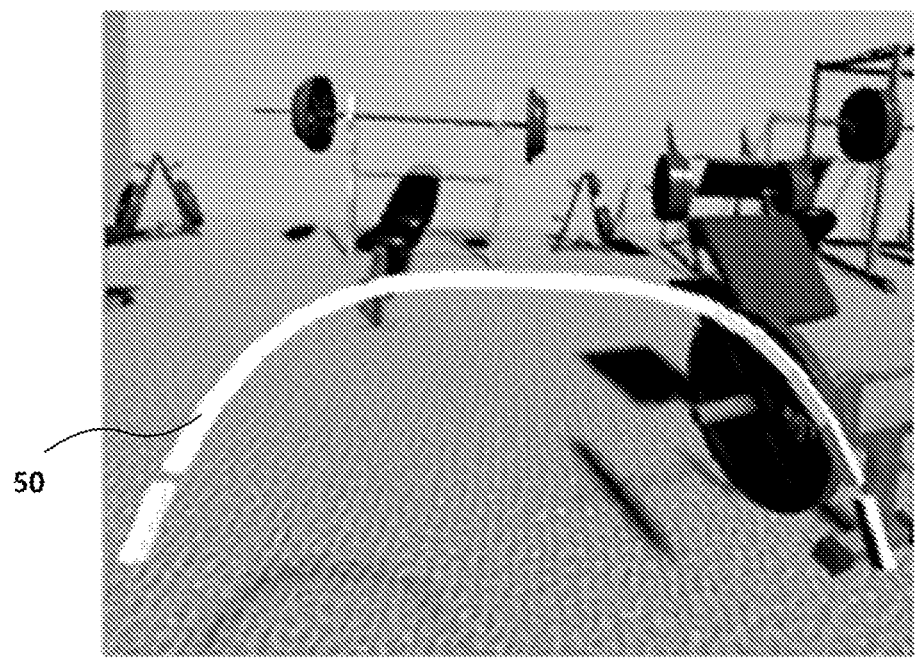
FIG. 13 is a drawing depicting a third embodiment of an application using the virtual flexible object implementation device and method of the present invention.

FIG. 11 is a diagram illustrating a first embodiment of an application using the virtual flexible object implementation device and method of the present invention, FIG. 12 is a diagram illustrating a second embodiment of an application using the virtual flexible object implementation device and method of the present invention, and FIG. 13 is a diagram illustrating a third embodiment of an application using the virtual flexible object implementation device and method of the present invention.

FIG. 11 is a fencing application, which is very indicative of the ability of the virtual flexible object implementation device 100 to create the changing stiffness of a virtual object held in the hand. The user can experience fencing with three weapons: a foil (21), a sabre (22), and an epee (23). Each of these three is characterized by a specific stiffness response.

The foil (21) has the most flexible blade, has a thin, square cross-section, can be bent in any direction, and has a stiffness of 11.0 Nmm/°. The sabre (22) has a shorter, stiffer, 'Y' shaped cross-section, with stiffnesses of 20.0 Nmm/° and 70.0 Nmm/° across the x and y axes, respectively. The epee (23) has a triangular cross-section and is the stiffest, with a constant stiffness of 70.0 Nmm/° in all directions.

Dynamic stiffness is used to change the properties of a material, such as its "state" (solidifying, hardening/freezing, softening/melting) or "shapes" (elongating/shortening). This is useful for creating applications that require high realism, such as industrial training or games. For example, it can be used to increase the realism of cooking in virtual reality (VR). In FIG. 12, a user can experience making cream in a bowl. Initially, the cream 30 is in a liquid state and the dough feels very flexible in any direction, but as the user mixes the cream with the utensils 40, the cream becomes frothy and the cream feels increasingly stiffer over time.

The example of FIG. 13 illustrates an example where the virtual flexible object implementation device 100 can be used with two hands, beyond the case where the virtual flexible object implementation device 100 is shaken with one hand. That is, another physical handle can be attached to the end of the virtual flexible object implementation device 100 to make it a two-handed controller. In this way, it can be used as a virtual exercise machine 50 that can be bent from both sides as shown in FIG. 13, and the strength of the virtual exercise machine can be adjusted by controlling and changing the stiffness of the virtual flexible object implementation device 100, as if increasing the weight of the exercise machine.

Figure 14:
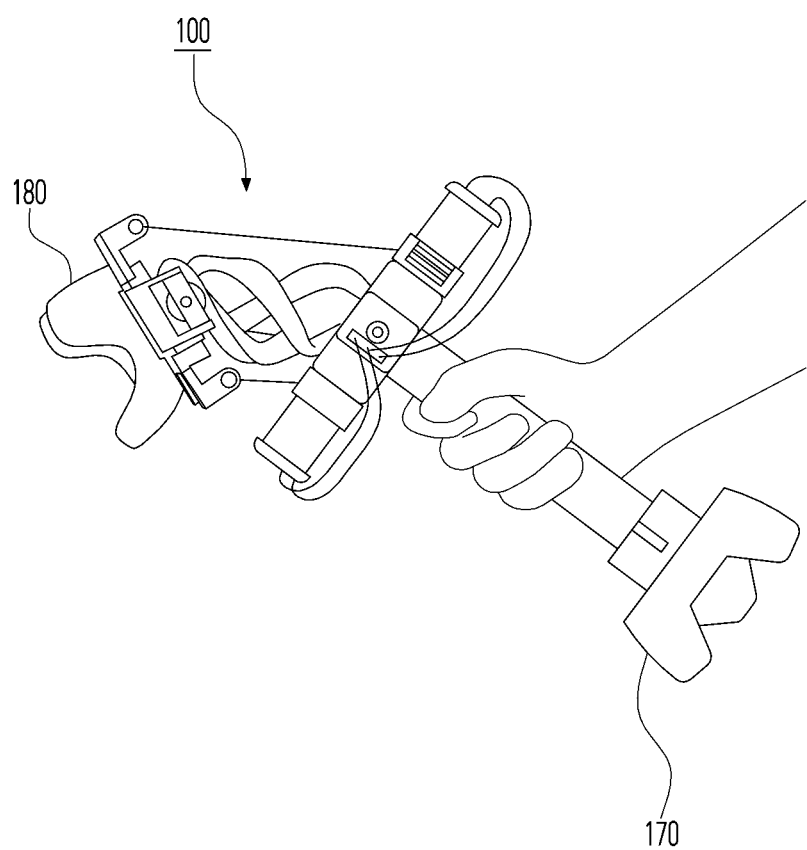
FIG. 14 is a drawing depicting the overall structure of a virtual flexible object implementation device with a front tracker.
Figure 15:
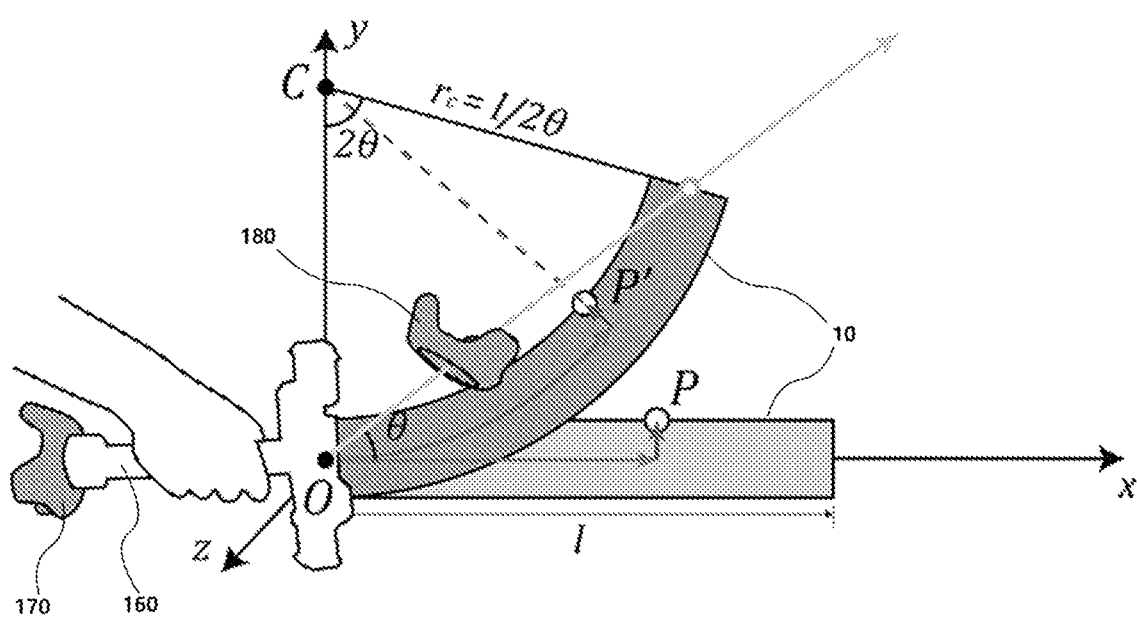
FIG. 15 is a drawing illustrating a method for calculating a deformed shape of a virtual object using a front tracker and a rear tracker.

FIG. 14 is a diagram illustrating an overall structure of the virtual flexible object implementation device 100 with a front tracker, and FIG. 15 is a diagram illustrating a method for calculating a deformed shape of a virtual object using a front tracker and a rear tracker.

The virtual flexible object implementation device 100 of FIG. 14 further comprises a front tracker 180 in addition to the rear tracker 170 provided in the virtual flexible object implementation device 100 of FIG. 2.

The rear tracker 170 of FIG. 2 measures the current position of the rear tracker 170 and transmits the measured position to the VR/AR device described above, so that the VR/AR content can identify the position of the virtual flexible object implementation device 100 that the user moves, and the VR/AR content can display the virtual flexible object on the screen. In FIG. 14, by the rear tracker 170 and the front tracker 180, from the bending shape of the virtual flexible object implementation device 100, the deformation shape of the virtual flexible object appearing on the VR/AR content screen, such as the deformation shape of the flexible beam 10 of FIG. 1, can be more accurately represented, which will be described below with reference to FIG. 15.

In FIG. 15, the virtual flexible object implementation device 100 is shown, with the quaternion joint 110 and tendon 120 omitted for convenience. When the virtual flexible beam 10 is extended, an axis parallel to the flexible beam and passing through the center of the flexible beam is called the x-axis, an axis perpendicular to the x-axis is called the y-axis, and an axis perpendicular to the x-axis and the y-axis is called the z-axis.

In this case, suppose that the virtual flexible object implementation device 100 is bent by θ about the z-axis. Here, θ is the angle connecting the origin O and the center of the front tracker 180. Given that the length of the flexible beam 10 is l, the length remains unchanged when bent, and the bent flexible beam 10 forms an arc. At the point 'A' where the extension line connecting the origin and the front tracker 180 meets the end of the bent flexible beam 10, the triangle COA forms an isosceles triangle, so each ACO is 2θ. Therefore, when the radius CA (=CO) is called $r_c$, it is $r_c = l/2θ$, and the value of θ determines the point C on the y-axis.

From this, if the coordinates of point P on the horizontal, stretched flexible beam in FIG. 15 are (x, y) in cartesian coordinates, the coordinates of the position P' of point P on the bent flexible beam are ($r_c$-y, 2θx/l) in cylindrical coordinates centered at point C.

Therefore, in addition to the already known length l of the flexible beam, knowing the position of the rear tracker 170 determines the origin O. Knowing the position of the front tracker 180 determines the angle θ connecting the origin O and the center of the front tracker 180. Thus, for the coordinates (x, y) of any point on the stretched flexible beam 10 relative to the origin O, the position of the point on the bent flexible beam is known, and the exact trajectory of the bent flexible beam can be determined.

The rear tracker 170 and the front tracker 180 may each measure their position and transmit that position information directly to the VR/AR device, or they may be configured to transmit their measured position values to the control unit of the virtual flexible object implementation device 100, and the control unit may transmit them to the VR/AR device via the communication unit.

Upon receiving the position information of the rear tracker 170 and the front tracker 180, the VR/AR device can determine the trajectory of the bent flexible beam and accurately display it on the VR/AR content screen by operating the VR/AR content program as described above.

Figure 16A:
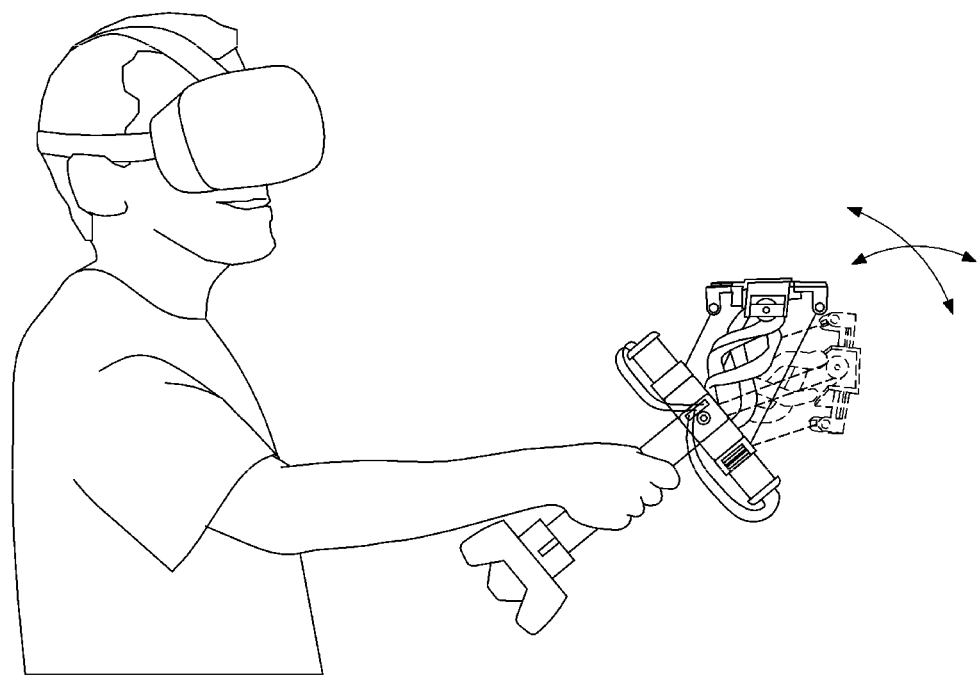
FIG. 16A is a drawing illustrating the use of the virtual flexible object implementation device of the present invention.
Figure 16B:
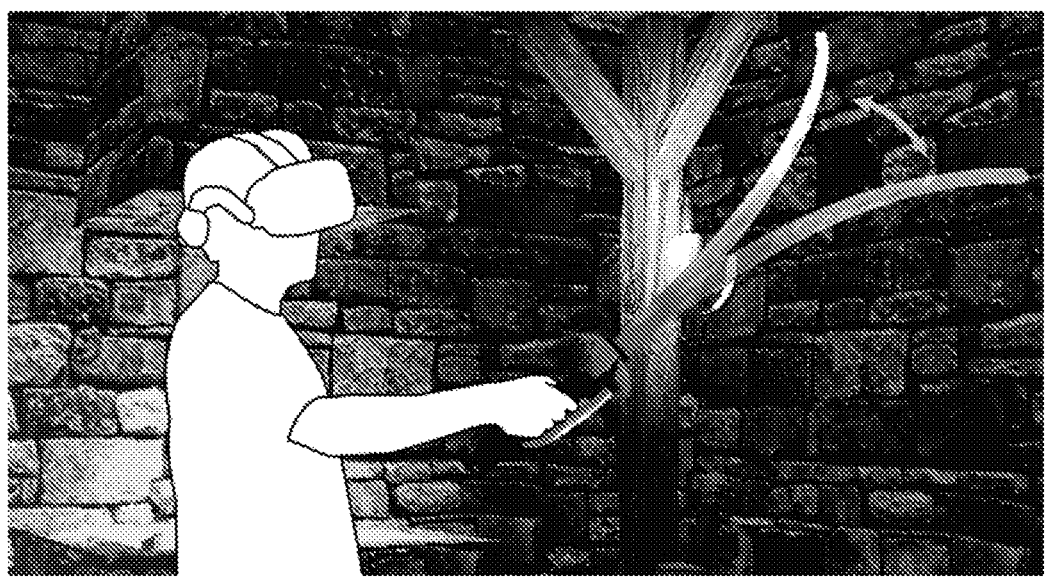
FIG. 16B is a drawing illustrating the shape of a virtual flexible sword in a corresponding virtual reality content screen.

FIGS. 16A and 16B are diagrams illustrating the use of the virtual flexible object implementation device 100 of the present invention, and the form of a virtual flexible sword on a corresponding virtual reality content screen.

In FIG. 16A, the quaternion joint 110 in the virtual flexible object implementation device 100 is bent by an action of the user's hand, and from this, the bent trajectory of the virtual flexible sword on the VR/AR content screen shown in FIG. 16B can be accurately drawn by the method described with reference to FIG. 15.

Figure 17A:
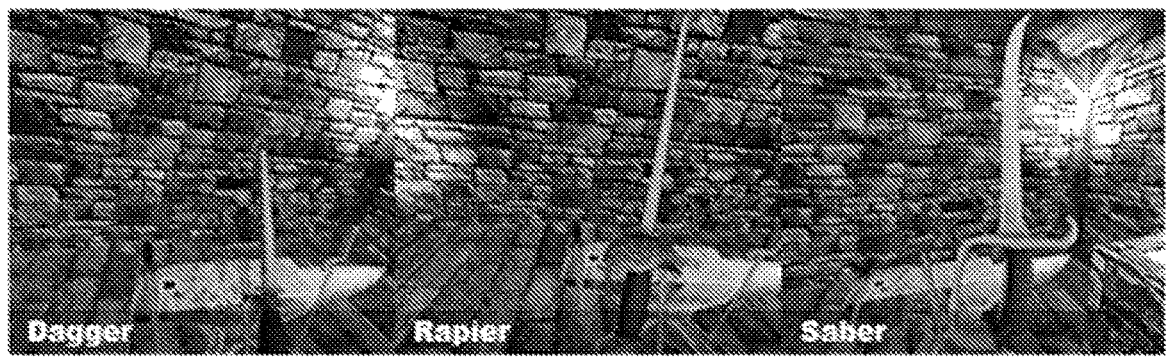
FIG. 17A is a drawing illustrating an embodiment of a type of sword.
Figure 17B:
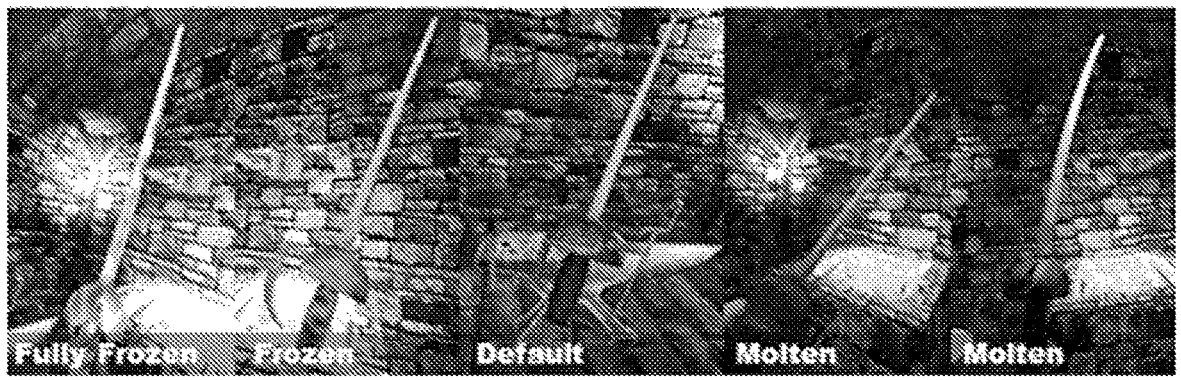
FIG. 17B is a drawing illustrating the state of the sword of FIG. 17A in a virtual reality content screen.

FIGS. 17A and 17B are diagrams illustrating an embodiment of a type of sword and its state in a VR/AR content screen.

The 'Rapier' of FIG. 17A is thin, long, isotropic, and has a stiffness of 22.2 Nmm/°. The 'Dagger' in FIG. 17A is a short, elongated knife with a stiffness of 44.5 Nmm/°. The 'Saber' in FIG. 17A has the same length as the 'Rapier', but the blade is configured to bend when swung in a flat direction perpendicular to the flat part of the blade, resulting in a small stiffness of 17.1 Nmm/°, but when swung in an edge direction parallel to the flat part of the blade, the blade does not bend, resulting in a large stiffness of 51.3 Nmm/°. This adjustment of the stiffness is accomplished by sending the VR/AR content to the virtual flexible object implementation device 100 as a control message to control the stiffness of each of the four tendons, as described above with reference to FIG. 10, and the control unit of the virtual flexible object implementation device 100 adjusts the stiffness of each tendon according to the control message.

FIG. 17B also illustrates an embodiment in which the stiffness of the sword within the VR/AR content varies depending on the heat applied to the blade. This situational stiffness variation is also accomplished by being controlled in the same manner as described above.

What is claimed is:

1. An apparatus for implementing dynamic haptic response of a flexible object (hereinafter referred to as a "virtual flexible object implementation apparatus") comprising:
    a quaternion joint that fulfills the role of a joint, capable of being bent in any direction of 360 degrees according to an applied force;
    four (4) tendons, each rotating in the form of a loop, which are strings, each causing expansion or contraction depending on a particular direction in which said quaternion joint is bent;
    a spool, which rotates to support the loop formed by the string of each of said tendons at one end;
    a pulley supporting and rotating the loop formed by the string of each of said tendons at an opposite end of said spool; and,
    a control device for controlling the rotation of said spool of each of said tendons.

2. The apparatus of claim 1,
    wherein said spool includes
    a first spool; and,
    a second spool laterally attached to said first spool and rotating in a same direction as said first spool.

3. The apparatus of claim 2,
    wherein said strings of each tendon includes,
    a first wire having one end fixedly attached to said first spool; and
    a second wire fixedly having one end attached to said second spool and other end connected in series with said first wire,
    wherein said first wire is made of a material having a higher elasticity than that of said second wire.

4. The apparatus of claim 1, further comprising a communication unit for receiving control messages for controlling a stiffness of each of said tendons from a device on which a virtual reality (VR) or an augmented reality (AR) content is operated.

5. The apparatus of claim 4,
    wherein said control message includes a stiffness value to be set for each of said tendons,
    wherein said control device controls rotation of the spool on which the string of each tendon is wound or unwound, based on the received stiffness value.

6. The apparatus of claim 5,
    wherein said control device includes a table mapping the stiffness value to be set on the tendon to a corresponding number of revolutions of the spool and controls rotation of the spool according to the corresponding number of revolutions of the spool mapped to the received stiffness value.

7. The apparatus of claim 1, further comprising a motor to drive rotation of the spool.

8. The apparatus of claim 1, further comprising:
    a front tracker for measuring a position of a front surface of said virtual flexible object implementation apparatus; and,
    a rear tracker for measuring a position of a rear surface of said virtual flexible object implementation apparatus.

9. The apparatus of claim 1,
    wherein position information of the front surface measured by the front tracker is directly transmitted by the front tracker to a device on which a VR/AR content is operated (hereinafter referred to as the "VR/AR device") or is transmitted by the control device to the VR/AR device via the communication unit,
    wherein position information of the rear surface measured by the rear tracker is directly transmitted by the rear tracker to a device on which the VR/AR content is operated (hereinafter referred to as the "VR/AR device") or is transmitted by the control device to the VR/AR device through the communication unit.

10. The apparatus of claim 1 further comprising a handle for gripping by a user.

11. The apparatus of claim 10, wherein the handle for gripping by the user is configured to further engage an end of said quaternion joint so that said user can grip and apply force with both hands.

12. A method for controlling the virtual flexible object implementation apparatus of claim 1 to implement dynamic haptic response of a flexible object, the method comprising steps of:
    (a) receiving a control message for controlling stiffness of each tendon of said virtual flexible implementation apparatus from a device operating a virtual reality (VR) or an augmented reality (AR) content (hereinafter referred to as a "VR/AR device"); and
    (b) controlling the stiffness of each tendon of said virtual flexible object implementation apparatus in accordance with said control message.

13. The method of claim 12,
    wherein the control message received in the step (a) includes a stiffness value to be set for each of said tendons, and
    wherein, in the step (b), controlling rotation of the spool on which the string of each tendon is wound or unwound based on the received stiffness value.

14. The method of claim 13,
    wherein, in the step (b), controlling rotation of the spool based on a value of a number of revolutions of the spool mapped to the received stiffness value.

15. A device for controlling the virtual flexible object implementation apparatus of claim 1 to implement dynamic haptic response of a flexible object, comprising:
    at least one processor; and
    at least one memory storing computer executable instructions,
    wherein the computer executable instructions stored in said at least one memory cause said at least one, to perform:
    (a) receiving a control message for controlling stiffness of each tendon of said virtual flexible implementation apparatus from a device operating a virtual reality (VR) or an augmented reality (AR) content (hereinafter referred to as a "VR/AR device"); and
    (b) controlling the stiffness of each tendon of said virtual flexible object implementation apparatus in accordance with said control message,
    wherein the step (a) and the step (b) are performed continuously and repeatedly in accordance with progression of content in said VR/AR device.

16. A method, performed by a device on which a virtual reality (VR) or an augmented reality (AR) content is operated (hereinafter referred to as a "VR/AR device"), for implementing deformation of a virtual flexible object on a screen of the VR/AR device through an operation of a VR/AR content application, the method comprising:

(a) receiving, from a virtual flexible object implementation apparatus, front position information of said virtual flexible object implementation apparatus measured by a front tracker, and rear position information of said virtual flexible object implementation apparatus measured by a rear tracker that is separated from the front tracker by a quaternion joint;

(b) calculating, from said front position information and said rear position information, for any point on said virtual flexible object on the screen, a position information moved by a bending of said virtual flexible object implementation apparatus; and (c) rendering said virtual flexible object on the screen according to said calculated position information.

17. The method of claim 16,
wherein the step (b) includes:

(b1) determining, from said rear position information, a position of origin;

(b2) calculating, from said front position information, an angle that a straight line connecting said origin and said front position forms with a centerline of said virtual flexible object passing through said origin in a state in which said virtual flexible object is stretched; and (b3) calculating, from said angle, a position of any point on said virtual flexible object in the stretched state that has been displaced by the bending of said virtual flexible object implementation apparatus.

18. The method of claim 17,
wherein the location information moved in step (b3) is calculated by (rc-y, 2θx/l) in cylindrical coordinates, $$r_c = \frac{l}{2\theta}$$

where l is the length of the virtual flexible object, θ is the angle that a straight line connecting said origin and said front position makes with the centerline of said virtual flexible object as it passes through said origin when the virtual flexible object is stretched, x is the x-coordinate in the cartesian coordinate system of any point on the virtual flexible object in the extended state, y is the y-coordinate in the cartesian coordinate system of an arbitrary point on the virtual flexible object in the extended state.

* * * * *